US012714163B2

(12) United States Patent
Saco

(10) Patent No.: US 12,714,163 B2
(45) Date of Patent: Aug. 25, 2026

(54) ELECTRICALLY HEATED GARMENT SYSTEM

(71) Applicant: Frank Saco, Walled Lake, MI (US)

(72) Inventor: Frank Saco, Walled Lake, MI (US)

( * ) Notice: Subject to any disclaimer, the term of this patent is extended or adjusted under 35 U.S.C. 154(b) by 336 days.

(21) Appl. No.: 18/437,694

(22) Filed: Feb. 9, 2024

(65) Prior Publication Data

US 2024/0268491 A1 Aug. 15, 2024

Related U.S. Application Data

(60) Provisional application No. 63/445,097, filed on Feb. 13, 2023.

(51) Int. Cl.
*A41D 13/005* (2006.01)
*H05B 1/02* (2006.01)

(52) U.S. Cl.
CPC ....... *A41D 13/0051* (2013.01); *H05B 1/0272* (2013.01)

(58) Field of Classification Search
CPC .... A41D 13/0051; H05B 1/0272; H05B 3/34; H05B 3/342; H05B 3/345; H05B 3/347
USPC .......................................................... 219/211
See application file for complete search history.

(56) References Cited

U.S. PATENT DOCUMENTS 5,623,772 A * 4/1997 Sunderland .......... A43B 3/0031 36/2.6
7,816,628 B2 10/2010 Fernandez et al.
9,833,027 B2 12/2017 Taylor et al.
9,961,723 B2 5/2018 Chen
10,292,438 B2 5/2019 Fortenbacher
10,893,576 B2 1/2021 Strecker
10,973,266 B2 4/2021 Weir et al.
11,477,853 B2 10/2022 Gray et al.
2008/0023460 A1 1/2008 Huang
2008/0116189 A1* 5/2008 Fernandez ............. H05B 3/342 219/211
2009/0289046 A1 11/2009 Richmond
2011/0220634 A1* 9/2011 Yeh ...................... A47G 9/0215 219/482
2013/0020304 A1 1/2013 Zainzinger et al.
2015/0230524 A1* 8/2015 Stevens .................... H05B 1/02 219/494
2015/0382402 A1 12/2015 Chen et al.
2017/0196275 A1 7/2017 Tam et al.
2018/0103694 A1 4/2018 Fortenbacher
2019/0150521 A1 5/2019 Pai
2021/0291009 A1* 9/2021 Paganini ............ A63B 71/0622
2022/0225696 A1 7/2022 Farrell et al.

* cited by examiner

*Primary Examiner* — Sang Y Paik
(74) *Attorney, Agent, or Firm* — Dinsmore & Shohl LLP

(57) ABSTRACT

A thermally heating garment system, including upper and lower wearable garments, each including an integrated wiring network for distributing resistive heat across a surface thereof. A pocket is integrated into each of the garments for receiving a battery pack for providing resistive thermal heat to the distributed wiring networks extending through the upper and lower wearable garments. Overlapping wireless charging contact points are established between each of the battery packs and surface locations of the garment within a footprint of the integrated pockets. The battery pack further includes any of a Lithium Ion or Nickel Cadmium style charging units, in addition to an on-off switch and a low to hi heating level adjustment feature.

3 Claims, 4 Drawing Sheets

ELECTRICALLY HEATED GARMENT SYSTEM

CROSS REFERENCE TO RELATED APPLICATIONS

The present application claims priority of U.S. Ser. No. 63/445,097 dated Feb. 13, 2023.

FIELD OF THE INVENTION

The present invention relates generally to electrically heated garments. More specifically, the present invention teaches an improved electrically heated garment, including each of upper and lower portions, and which includes a novel battery pack with connection protocol for providing resistive heating to a wiring network extending through the upper and lower garments.

BACKGROUND OF THE INVENTION

The prior art is documented with examples of heated garments, such including conductive wires and connected power source. An example of this is depicted in U.S. Pat. No. 7,816,628. Another relevant example is the heating plate for heated clothing and connecting structure disclosed in U.S. Pat. No. 9,961,723. Also referenced is the heated garment and battery holster of U.S. Pat. No. 10,973,266.

SUMMARY OF THE INVENTION

The present invention discloses an improved electrically heated garment, including each of upper and lower portions, and which includes a novel battery pack with connection protocol for providing resistive heating to a wiring network extending through the upper and lower garments. The garments each include an integrated holster which receives a separate battery pack. Additional to conventional plug in options, the battery pack and holster can also exhibit overlapping contact pads for wireless charging docking in order to provide power to the respective thermal wiring networks associated with the garments.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses an improved electrically heated garment, including each of upper and lower portions, and which includes a novel battery pack with connection protocol for providing resistive heating to a wiring network. As will be described, the present invention provides for an improved and non-obvious heated garment system in which readily available and rechargeable battery packs are more quickly and readily installed into receiving pockets integrated into the garments.

Figure 5:
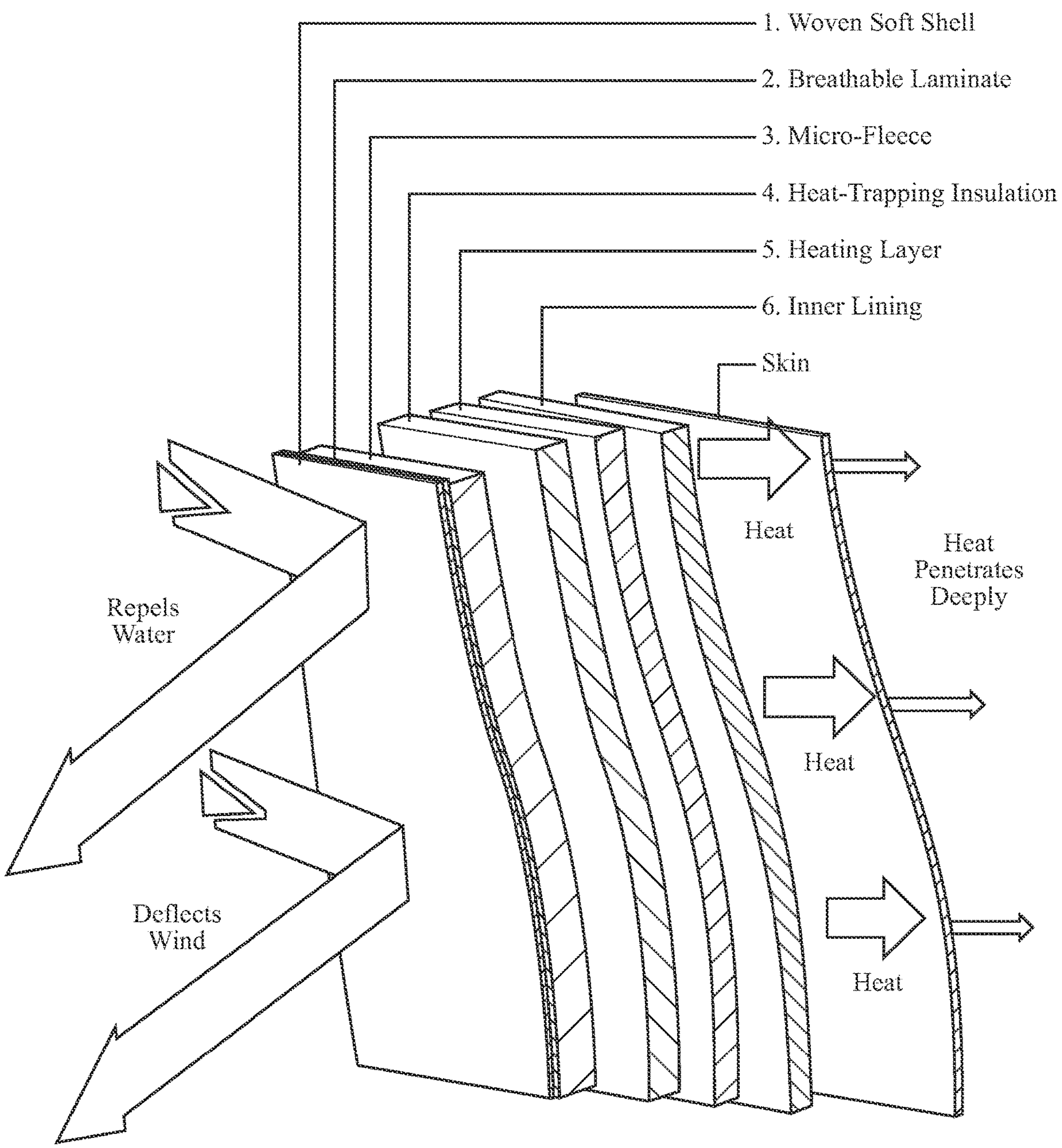
FIG. 5 PRIOR ART
FIG. 5 provides a Prior Art illustration of a multi-layer arrangement associated with an electrically heated garment and including each of an inner woven soft shell, succeeding breathable laminate layer, an intermediate micro-fleece layer, heat trapping insulation layer, heating layer, and inner lining.

With reference to FIG. 5, provided is a Prior Art illustration of a multi-layer arrangement associated with an electrically heated garment and including each of an inner woven soft shell 1, a succeeding breathable laminate layer 2, an intermediate micro-fleece layer 3, heat trapping insulation layer 4, heating layer 5, and inner lining 6. The intermediate heating layer 5, as is known, can include any type of mesh or wiring for providing any type of resistive heat throughout the garment layer.

In operation, the heated gear has thin wires built into it which heat up when a low electric charge is passed through, such originating from a battery supply source or (in the instance of in-home use) a 110V plug in option. Heated clothing is designed to keep the wearer warm and cozy, but not to get too hot. As is also understood, the wiring is separated by a waterproof membrane making them safe to use in damp conditions.

Figure 1:
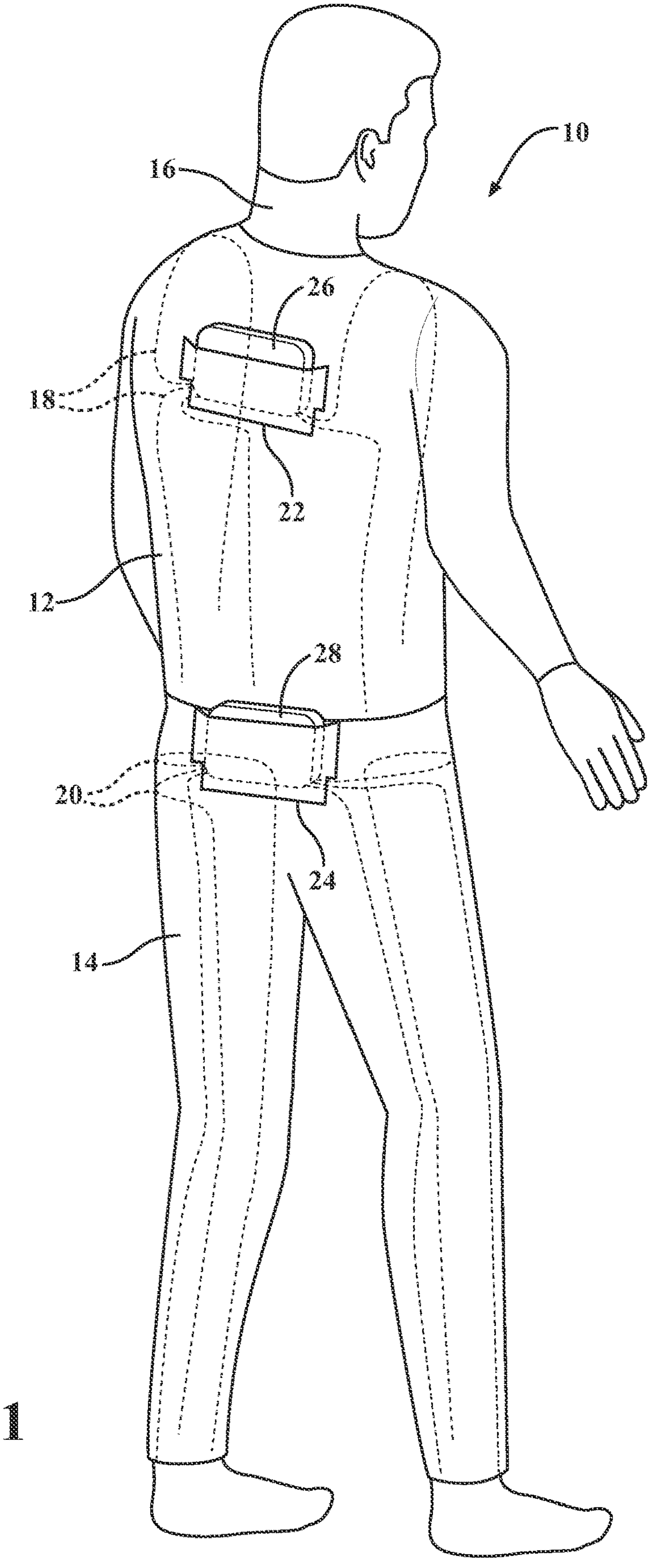
FIG. 1 discloses an environmental view of upper and lower wearable heated garments according to a non-limited embodiment of the present invention.

FIG. 1 discloses an environmental view, generally at 10 of upper 12 and lower 14 wearable heated garments according to a non-limited embodiment of the present invention, and which are shown being worn by a typical wearer 16. Each of the garments 12/14 include an interior wiring network, see at 18 for upper garment 12 and at 20 for lower garment 14.

Figure 2:
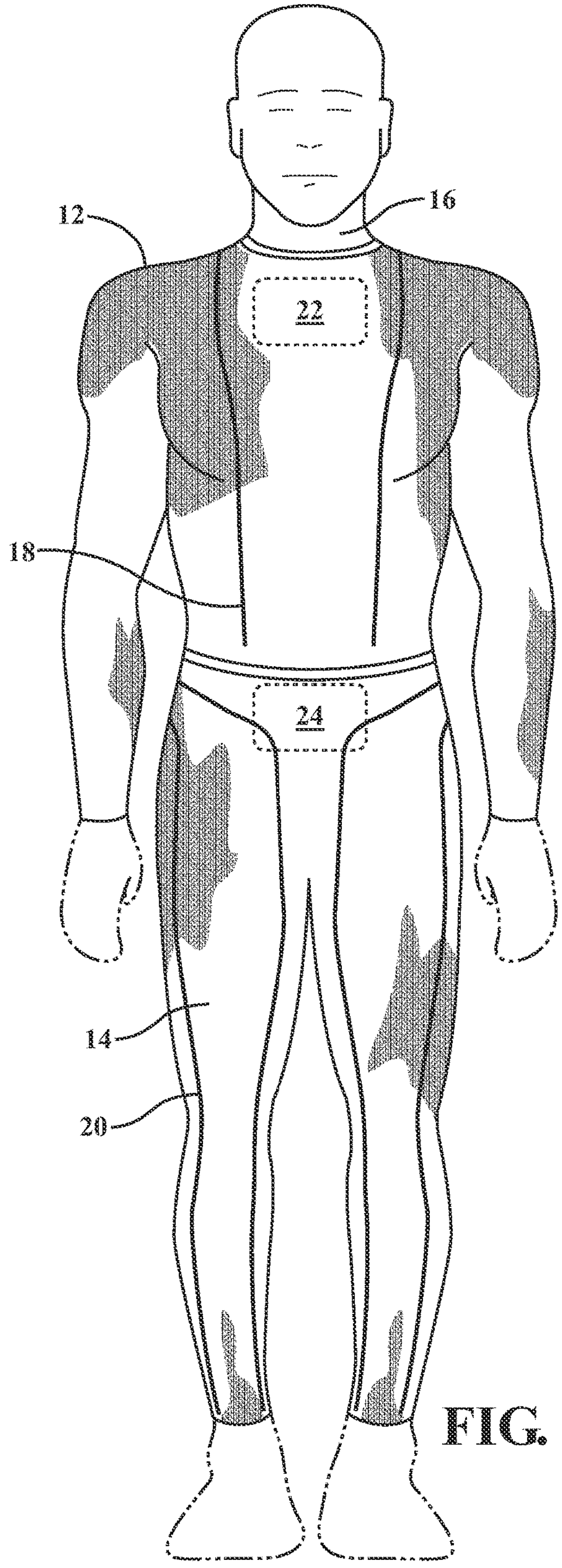
FIG. 2 is a front view of the wearable garments of FIG. 1.
Figure 3:
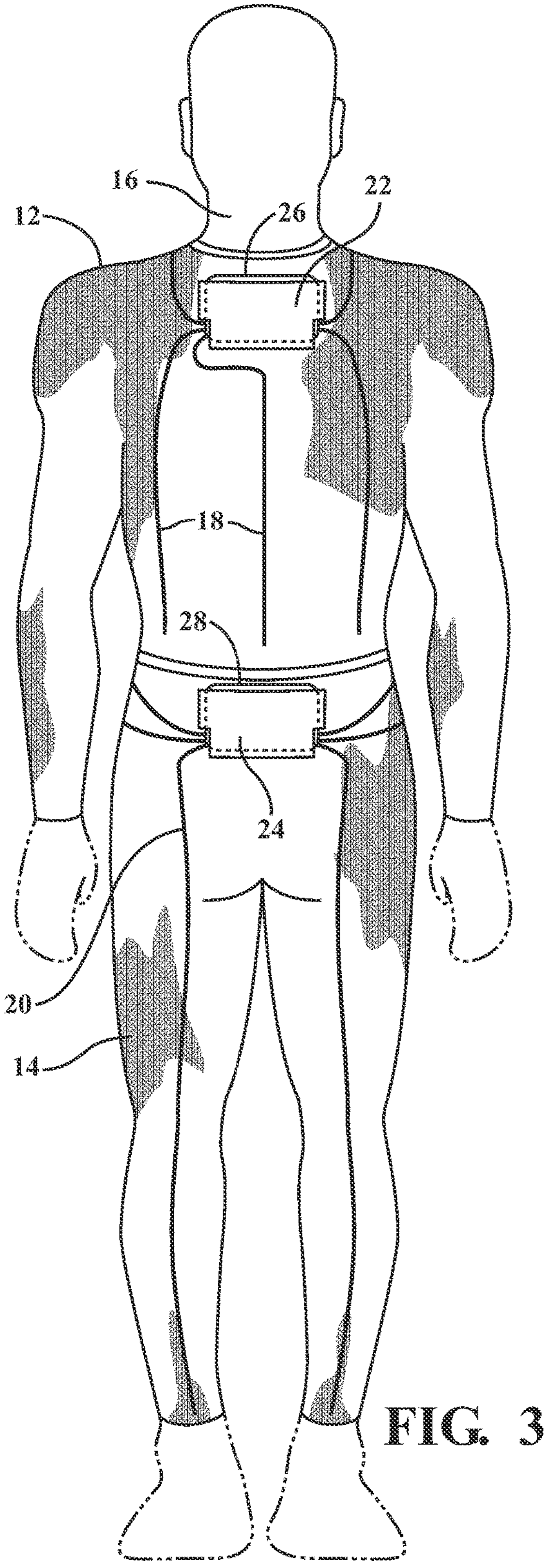
FIG. 3 provides a corresponding rear view and better illustrating the pockets integrated into the upper and lower garments for receiving the battery packs.

FIG. 2 is a front view of the wearable garments 12/14 of FIG. 1, with FIG. 3 providing a corresponding rear view and better illustrating a pair of pockets 22 and 24 integrated into the upper 12 and lower 14 garments, respectively for receiving battery packs 26 and 28.

Figure 4:
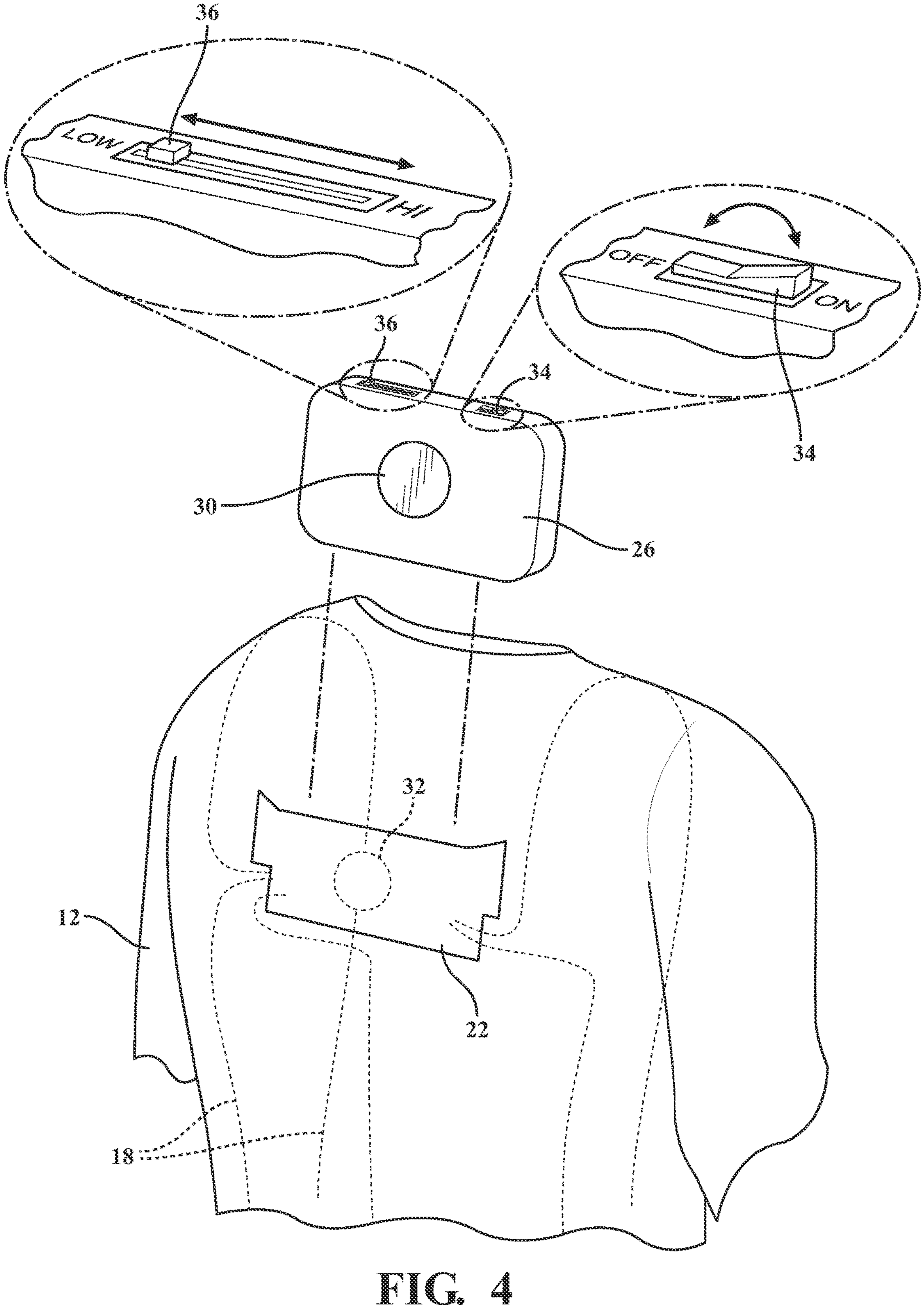
FIG. 4 is an exploded view of a battery pack shown in rotated and partially enlarged fashion which is seated within the capture pocket of a selected upper garment and including a proximity style wireless charging location for providing resistive heating current to the embedded wiring network configured into the garment.

Proceeding to FIG. 4, an exploded view is shown of selected battery pack 26 shown in rotated and partially enlarged fashion for the upper garment 12, and which is installable in order to be seated (see again FIG. 3) within the capture pocket 22 of the selected upper garment 12. The assembly includes a proximity style wireless charging location, see as depicted by charging pad 30 arrayed on a rear face of the depicted battery pack 26 which, upon rotation of the battery pack and installation within the receiving pocket 22, aligns with a further contact pad 32 integrated into the garment 12 body within the footprint of the integrated pocket 22 and in communication with contact locations of wiring network 18, this for providing resistive heating current to the embedded wiring network configured into the garment.

The battery pack can include any reliable and rechargeable power source not limited to Lithium Ion or Nickel Cadmium style charging units and, as shown in FIG. 4, can include additional features such as an on-off switch 34 and a low to hi heating level adjustment 36. Additional features, not shown, include appropriate control components for providing the resistive heat generating output, including again both the on/off 34 as well as the thermal control 36 functions.

Without limitation, the pockets can be resized or relocated from where shown for receiving the battery or power packs, with the arrangement of the overlapping contact locations for wireless induced charging being retained. It is also understood that the use of wireless charging can be substituted with dedicated plug-in options which include a harness with input extending from the garment (not shown) co-located with the pocket and which can be easily attached to the battery pack.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A thermally heating garment system, comprising:

upper and lower wearable garments, each including an embedded wiring network for distributing resistive heat across a surface thereof to a wearer of the garment; and a three-sided pocket integrated into a rear of each of the upper and lower garments for receiving a rechargeable battery pack, overlapping wireless charging contact pads established in each of the battery packs and opposing surfaces of the garments which are in communication with the wiring networks configured in the garments such that, upon installing the battery packs within the pockets, the battery packs providing the resistive thermal heat to the distributed wiring networks through the upper and lower wearable garments.

2. The heating garment of claim 1, said battery pack further comprising any of a Lithium Ion or Nickel Cadmium style charging units.

3. The heating garment of claim 2, said battery pack further comprising an on-off switch and a low to hi heating level adjustment feature.

* * * * *